(12) United States Patent
Stone

(10) Patent No.: US 10,936,754 B1
(45) Date of Patent: Mar. 2, 2021

(54) PRIVACY REGULATING SOCIAL NETWORK SYSTEM AND METHOD

(71) Applicant: Trudy Stone, Woodland Hills, CA (US)

(72) Inventor: Trudy Stone, Woodland Hills, CA (US)

( * ) Notice: Subject to any disclaimer, the term of this patent is extended or adjusted under 35 U.S.C. 154(b) by 0 days.

(21) Appl. No.: 16/821,862

(22) Filed: Mar. 17, 2020

Related U.S. Application Data

(60) Provisional application No. 62/974,798, filed on Dec. 24, 2019.

(51) Int. Cl.
*H04L 29/06* (2006.01)
*G06F 21/62* (2013.01)
*G06Q 50/00* (2012.01)

(52) U.S. Cl.
CPC ......... *G06F 21/6254* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 2009/0125521 A1* | 5/2009 | Petty | ..................... | G06F 21/604 |
| 2010/0024042 A1* | 1/2010 | Motahari | ............... | G06Q 10/10 726/26 |
| 2012/0266250 A1* | 10/2012 | Uhl | ..................... | G06F 21/6254 726/26 |
| 2013/0205400 A1* | 8/2013 | Yerli | ..................... | H04L 63/04 726/26 |
| 2013/0205408 A1* | 8/2013 | Yerli | ................... | G06F 21/6245 726/28 |
| 2017/0142044 A1* | 5/2017 | Ball | ..................... | G06Q 50/01 |
| 2018/0121678 A1* | 5/2018 | York | .................... | H04L 63/107 |
| 2019/0005266 A1* | 1/2019 | York | .................... | H04L 63/107 |
| 2019/0058683 A1* | 2/2019 | Morrison | ................ | H04L 51/14 |
| 2019/0058684 A1* | 2/2019 | Morrison | ............ | G06F 16/9535 |
| 2019/0332807 A1* | 10/2019 | LaFever | ............. | G06F 21/6254 |

* cited by examiner

*Primary Examiner* — Jeffery L Williams
(74) *Attorney, Agent, or Firm* — Cohen IP Law Group, PC; Michael N. Cohen

(57) ABSTRACT

A social network system that includes tools and technologies to keep the identities of the users of the system anonymous is provided. The system requires that some users use usernames that are not associated in any way with their legal names. In addition, other identifying content such as photographs are disallowed in certain circumstances. The system includes the tools to review and remove disallowed content from being published on the social network. The system also provides tools for its users to express themselves while engaging in creative endeavors such as creating artwork, creating music, creating videos, singing, journaling and creative writing, acting, inventing, interviewing and hosting and other endeavors. In this way, the system provides a social platform that promotes creativity, unity, inclusion, self-growth, support and healing.

20 Claims, 14 Drawing Sheets

PRIVACY REGULATING SOCIAL NETWORK SYSTEM AND METHOD

RELATIONSHIPS TO PRIOR APPLICATIONS

This application claims priority to U.S. Provisional Application No. 62/974,798, filed Dec. 24, 2019, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to social networking systems and methods, including a social network system that regulates the privacy of its users.

BACKGROUND

A number of social networks currently exist allowing users to communicate with one another using posts, comments, images, videos and/or other types of communications. In general, a particular user may have a list of contacts within a social network that he/she is "connected" with, and it is these users that he/she may communicate with. Each user typically identifies themselves using their real legal names and their identities are well known to other users as they engage with the networks.

Communications (or posts) from one user to his/her connections may also be shared by those connections to their connections and viewed publicly (even globally). In this way, a post may travel to new connections outside the originator's contact list with the originator's name and identity being shared publicly.

While there may be benefits of this, often times the public sharing of a person's identity and their posts is followed by hostile comments directed to the originator, including shaming, rejection, ridicule and other emotionally harmful actions. And because the originator's identity may be public and known, this may result in feelings of stress, disappointment, depression and even suicide.

Accordingly, there is a need for a social networking system that keeps the identity of its users private while providing tools to express oneself through creative outlets, thereby promoting unity, inclusion, self-growth and healing.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

DETAILED DESCRIPTION OF EXEMPLARY EMBODIMENTS

As used herein, unless used otherwise, the following terms and abbreviations have the following meanings:

A social network is a dedicated website system or other application which enables users to communicate with each other by posting information, comments, messages, images, etc.

Social contacts are nodes within a social graph (representing an individual or organization) to which another node is socially connected (e.g., through a social network). When individuals and/or organizations are connected through a social network, the individuals and/or organizations may communicate with one another through the social network.

Cookies are small text files (typically up to 4 KB) created by a website and stored on the user's computer, either temporarily or permanently on the computer's hard drive. Cookies provide a way for the website to recognize the user's browsing actions and keep track of his/her preferences.

Figure 1:
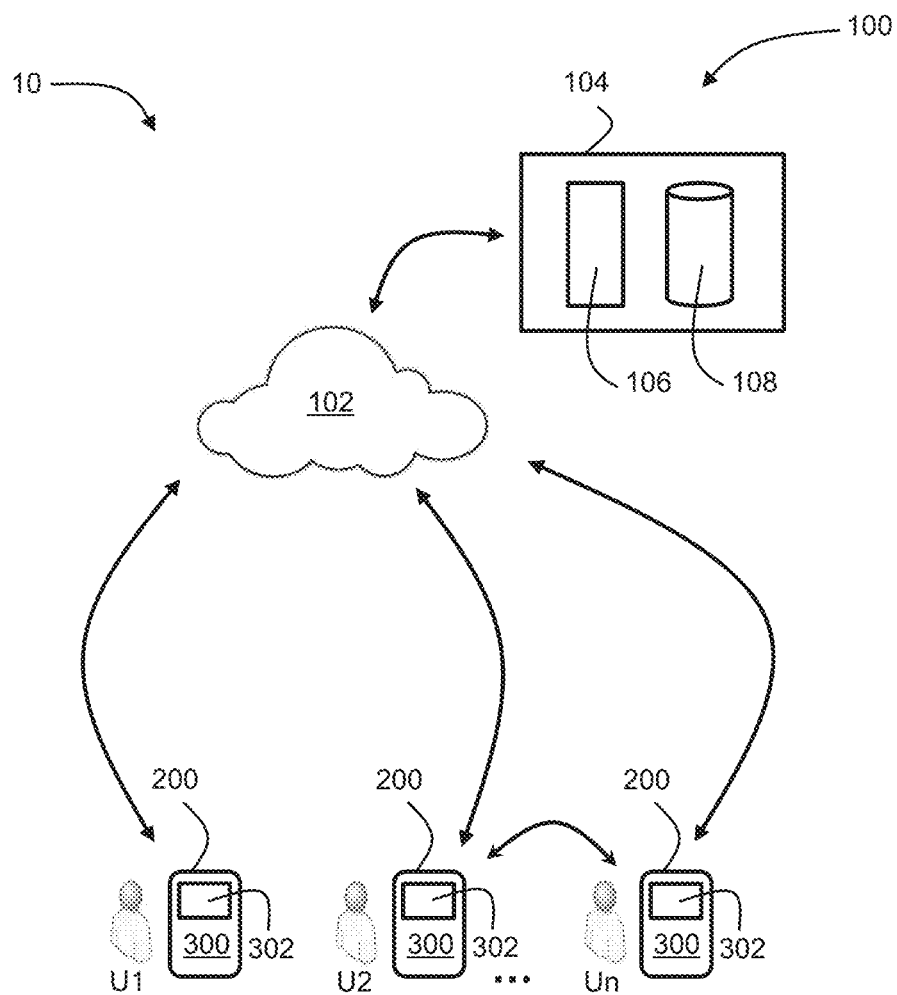
FIG. 1 shows an overview framework of a social network system in accordance with exemplary embodiments hereof.

FIG. 1 shows an overview of an exemplary framework for a social media network according to exemplary embodiments hereof. As shown, the social network system 10 includes a cloud platform 100 accessible through a network 102 such as the Internet, LAN, WAN, wireless communication systems, cellular communication systems, telephony or other types of communication systems or protocols.

The system 10 is accessed by multiple users U0, U1, U2 Un (e.g., via the network 102) using an application 300 (e.g., a mobile application or "app", a browser or other types of applications) running on one or more computing devices 200 (e.g., smart phones, tablet computers, laptops, desktop computers, mobile media players, etc.).

In general, and according to exemplary embodiments hereof, the social network system 10 socially links (connects) one or more users Un of the system 10 with one or more other users Urn of the system 10. In some embodiments, the system 10 provides a social network that is designed to protect the privacy of each of its users Un. The system 10 provides an online environment built on trust, unity and respect for its users Un, allowing the users Un to express themselves without the fear of judgement from others, and without the social pressures to be "cool" and to "fit in". The system 10 is designed and implemented to provide a supportive community of like-minded users Un, where each user Un may present themselves as their "true selves" and to be accepted for who they are. The system 10 promotes unity, inclusiveness and a sense of belonging, thereby providing an environment of support, self-growth and healing.

In some embodiments, the system 10 provides a platform for each user Un to express themselves through a variety of different creative activities including (without limitation) artwork, music, video, singing, journaling, creative writing, acting, inventing, hosting, interviewing, other activities and any combination thereof. In this way, the users Un of the system 10 may express themselves through their creativity and interact with one another by supporting each other's talents.

Figure 2:
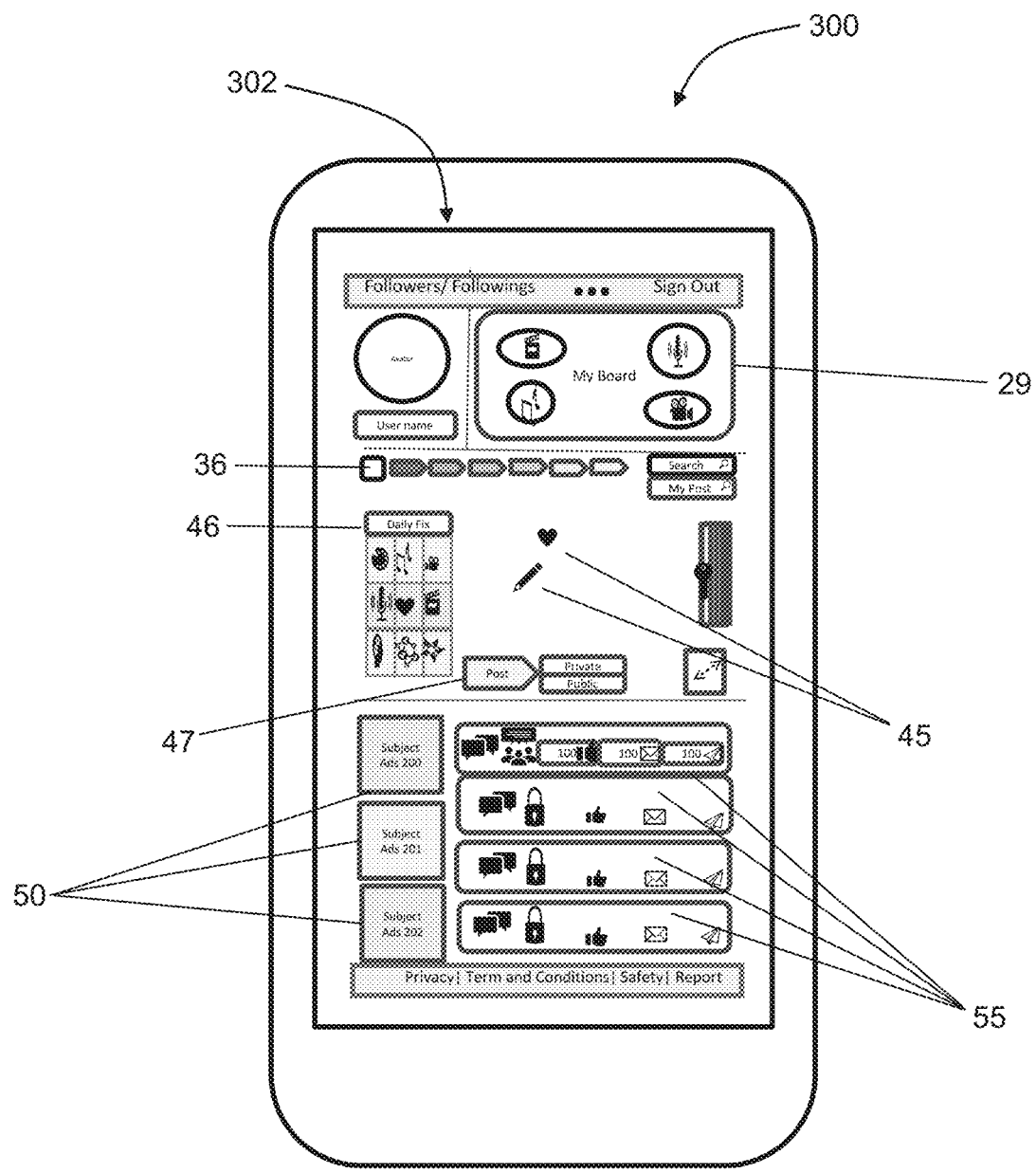
FIG. 2 shows aspects of a social network system graphical user interface (GUI) in accordance with exemplary embodiments hereof.

To provide an initial general understanding of the system 10 and its general functionalities, FIG. 2 shows an example graphical user interface 302 (GUI) that the system 10 may provide. Note that FIG. 2 depicts an initial subset of some of the elements of the GUI 302, and that other elements of the GUI 302 will be described in other sections.

In some embodiments, the GUI 302 includes at least some of the following elements:
1. My Board section 29 where users Un may post his/her favorite creatives on a public space appearing at the top of his/her default home timeline page.
2. Tag section 36 for users Un to associate topical system tags to his/her social network content and to direct the posts to be viewable at applicable topical location(s) within the system 10 to be referenced and shared with other users Um.
3. Pallet section 45 for users Un to journal, write, create artwork and/or perform other creative activities.
4. Daily fix section 46 that is used to launch tools (e.g., in the pallet section 45) for playful creativities, hobbies, healing activities, self-strengthening activities, being discovered professionally, etc.
5. Post section 47 that users Un use to upload posts and/or share other types of activities to timelines (sometimes based on tags). Posts created by each user Un may be stored in the posts database 132.
6. Commercial ads 50 that are served to users Un of the system 10 (typically served to areas of similar subjects, topics, tags, etc.).
7. Aspects of each user's previous posts 51-55, including (without limitation) the number of likes, shares, and/or comments. These aspects may be stored in the posts database 132. In some embodiments, these aspects are only seen by the end user Un of the original post. In addition, each user who has liked, shared, and/or commented may only see that they have liked, shared, and/or commented, but not the total numbers of likes, shares and/or comments the post may have received. In addition, if the original user Un provides a comment to a prior comment to the post, only the original user and the original commenter may view the interaction.

It is understood that the GUI 302 elements described above are meant for demonstration and that the GUI 302 may include a wide variety of additional elements as will be described in other sections.

In one exemplary embodiment hereof, the cloud platform 100 includes one or more servers 104 including one or more software systems 106 and one or more databases 108. The one or more software systems 106 may include operating systems, system software, web server software, social networking software, communication software, software applications, scripts, firmware, other types of software systems and any combination thereof.

Figure 3:
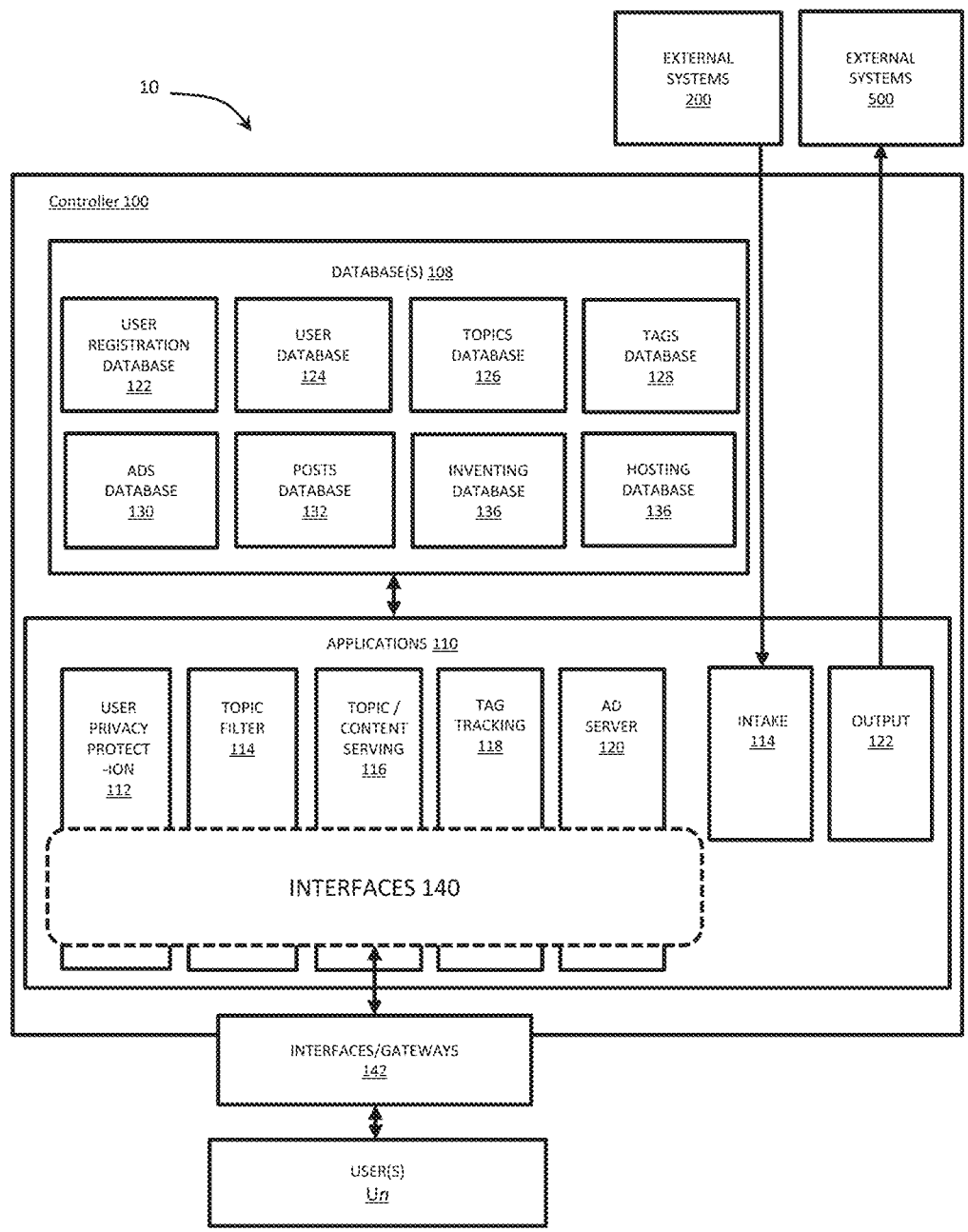
FIG. 3 shows aspects of a social network system in accordance with exemplary embodiments hereof.
Figure 4:
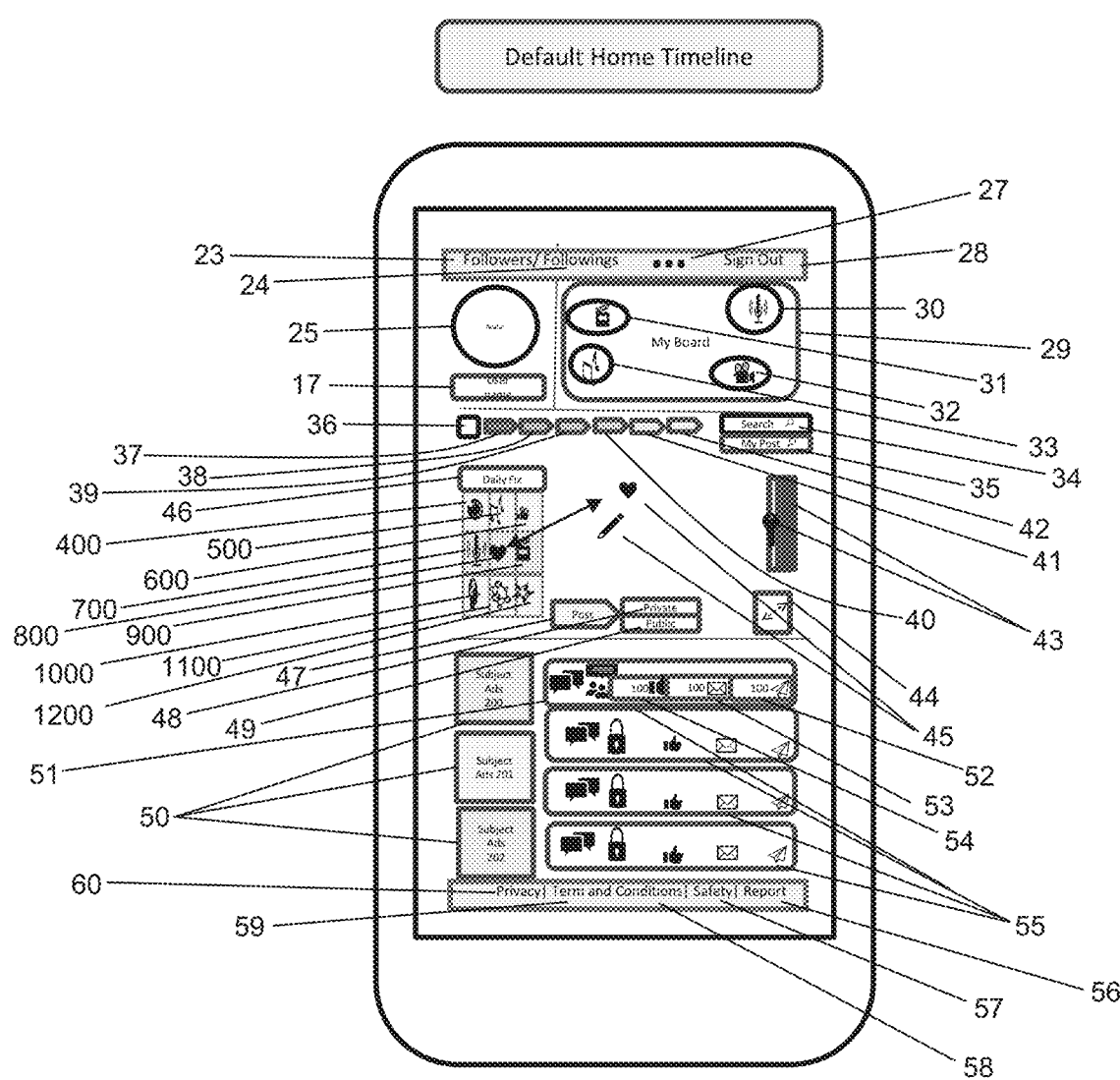
FIGS. 4-13 show aspects of social network system graphical user interfaces (GUIs) in accordance with exemplary embodiments hereof.

FIG. 3 shows aspects of an exemplary social network system 10 of FIG. 1. As shown, the social network system 10 comprises various applications 110 and one or more databases 108, described in greater detail below. The applications 110 may generally interact with the one or more databases 108.

The database(s) 108 may be or comprise one or more separate or integrated databases, at least some of which may be distributed. The database(s) 108 may be implemented in any manner, and, when made up of more than one database, the various databases need not all be implemented in the same way. It should be appreciated that the system is not limited by the nature or location of database(s) 108 or by the manner in which they are implemented.

Some of the applications 110 may provide one or more services via an appropriate interface. Other applications 110 may provide internal processing to the system 10. Although shown as separate applications 110 for the sake of this description, it is appreciated that some or all of the various applications 110 may be combined. The various applications 110 may be implemented in any manner and need not all be implemented in the same way (e.g., using the same software languages, interfaces or protocols).

The applications 110 may include one or more of the following applications 110:
1. User Privacy Protection application(s) 112
2. Topic Filtering application(s) 114
3. Topic/Content Serving application(s) 116
4. Tag Tracking application(s) 118
5. Ad Server application(s) 120
6. Other application(s)

The applications 110 also may include other applications and/or auxiliary applications (not shown). Those of ordinary skill in the art will appreciate and understand, upon reading this description, that the above list of applications is meant for demonstration and that the system 10 may include other applications that may be necessary for the system 10 to generally perform its functionalities as described in this specification. In addition, as should be appreciated, embodiments or implementations of the system 10 need not include all of the applications listed, and that some or all of the applications may be optional. It is also understood that the scope of the system 10 is not limited in any way by the applications that it may include.

The database(s) 108 may include one or more of the following databases:
1. User Registration database(s) 122
2. User database(s) 124
3. Topics database(s) 126
4. Tags database(s) 128
5. Ads database(s) 130
6. Posts database(s) 132
7. Other databases It is understood that the above list of databases is meant for demonstration and that the system 10 may include some or all of the databases, and also may include additional databases as required. It is also understood that the scope of the system 10 is not limited in any way by the databases that is may include.

Various applications 110 in the system 10 may be accessible via interface(s) 140. These interfaces 140 may be provided in the form of APIs or the like, made accessible to external users Un via one or more gateways and interfaces 142 (e.g., via a web-based application and/or an application running on a user's device).

In some embodiments, cookies and/or any other types of user tracking technologies are not utilized by the system 10 in any form whatsoever and are strictly forbidden.

In one exemplary embodiment hereof, in order to participate with the social network system 10, the user Un may register with the system 10 by providing his/her contact information and preferences. This information may be stored in the user registration database 122 to create the user's account. The registration process may include creating log-in credentials (e.g., username and password), and providing other types of contact information to the system 10. The system 10 also may ask security questions to the registering user Un and store the user's answers into the database 122 to be used to authenticate future logins. Other identifying and/or required information (e.g., payment information) may also be provided and stored.

In one exemplary embodiment hereof, the user privacy protection application 112 may perform privacy protection functionalities for each user Un as each user Un engages with the system 10 and with other users Um.

In one embodiment, the user privacy protection application 112 may facilitate the creation of each user's username that may be used to represent each respective user Un as the user Un engages with the system 10 and other users Urn. This information may be stored in the user database 124. In some embodiments, each user's username may not reflect the user's legal name, but instead, may be required to be a fictitious username that provides no reference to the user's true identity. In this way, all engagement with the system 10 may be anonymous and no legal names may be used and/or seen by any other users Un while the users Un engage with the system 10. In some embodiments, the user privacy protection application 112 inputs each username provided by each user Un and subsequently confirms that the username is fictitious. In some embodiments, the application 112 may check each provided username against a database of common names to confirm that the username is not a common name. In other embodiments, the application 112 applies artificial intelligence to authenticate that each username is indeed fictitious. For example, the application 112 may identify the words used to comprise the username and may confirm that none of the words are names. It is understood that the user privacy protection application 112 may utilize any type of method and/or technology to confirm that each username is fictitious, and that the username does not represent the actual legal name of any user.

In some embodiments, if a username is deemed to be non-fictitious, the username may be flagged and the user Un associated with the username may be notified of the problem. The user Un may be asked to provide another username and the application 112 may repeat the authentication process on the new username. If the user Un appears to be having trouble providing a fictitious username, the application 112 may provide the user Un with choices of potential usernames to use. In some cases, the application 112 may utilize known interests and/or hobbies of the user Un (e.g., provided during the registration process and stored in databases 122 and/or 124) and subsequently recommend usernames that include words that may resonate with the user Un. In some embodiments, the application 112 may provide a wizard that may guide the user Un through the username decision process.

In some embodiments, the user privacy protection application 112 may continuously review content posted, generated or otherwise associated with the system 10 and flag the use of legal names within the content. If a legal name of another user Un and/or a person not necessarily associated with the system 10, the application 112 may flag the name and remove it from the content (e.g., from the post). In this way, no legal names may be shown during discussions within the system 10 between users Un.

In one exemplary embodiment hereof, the use of legal names of one or more of the users Un of the system 10 may be allowed under certain circumstances. In these cases, a user Un may have two usernames, with one username being a fictitious username as described above, and a second username including the user's legal name or nickname. In some embodiments, the system 10 and/or the privacy protection application 112 may identify the circumstances under which the user's legal name is being used, and if the circumstances are approved for the use of a legal name, the application 112 may allow the continued use of the real name or username. However, if it is deemed to be a circumstance that does not allow for the use of a legal name username, the application 112 may flag the username as described above.

In some embodiments, the circumstances under which a real legal name and/or username may be used may include during the use of applications 110 that may require and/or benefit from the use of a user's real legal name. For example, if a user Un is engaging with a topic such as the "hosting and/or interviewing" topic (see below) with the topic serving application 116, the use of a real name may be beneficial and advantageous to the user's experience. In another example, if a user Un is posting his/her resume or interviewing for a particular job or internship through the topic serving application 116 or through other elements of the system 10, providing his/her legal name may be essential to the endeavor.

In some embodiments, a user Un may adjust his/her profile settings to allow and/or disallow the use of his/her legal name in particular areas of functionality within the system 10. For example, the user Un may allow his/her name to be used in certain posts and/or in certain areas of the system 10 but disallow the use of his/her legal name in other posts and/or in other areas of the system 10. For instance, a user Un may allow his/her legal name to be used in their private area where only friends and family are allowed, while disallowing his/her legal name in public areas. In another example, a user Un may allow the use of his/her legal name in a particular topic served by the topic serving application 116 while disallowing his/her legal name to be used in other topics served by the topic serving application 116. When a legal name is disallowed, the user Un may utilize a secondary fictional username. In this way, the user Un may remain anonymous during some activities with the system 10 and not anonymous during other activities with the system 10.

It is understood by a person of ordinary skill in the art that the system 10 may enable the use of legal names as usernames, and/or disable the use of legal names as usernames, depending on the system settings, on the user's profile settings, on other types of settings and any combination thereof. It is also understood that the scope of the system 10 is not limited in any way by allowing and/or disallowing the use of legal names during use of the system 10.

In one exemplary embodiment hereof, the user privacy protection application 112 filters and/or removes photographs from publicly viewable areas on the system 10 (e.g., in posts, etc.) that may be deemed to represent one or more users Un of the system 10. These photographs may include (without limitation) user profile photographs, selfies of users Un, individual photographs of users Un, group photographs of users Un, any other types of photographs of users Un and any combination thereof. In addition, the application 112 may filter and/or remove other types of photographs showing other subject matter that may be used to identify one or more users Un such as photographs of homes, schools, geographic areas or other types of subject matter that may be linked to one or more users Un. The application 112 may utilize object detection/recognition technology to identify elements within each photograph to determine if the photograph includes visual information that may be disallowed.

In one exemplary embodiment hereof, the topic filter application 114 may continually monitor the engagement of the users Un with the system 10 and may flag and/or remove topics of conversation (e.g., posts), imagery, or other content that may be disallowed. Disallowed topic information may be stored in the topic filter database 114. For example, in one embodiment, the topics of politics, body shaming and/or discrimination may be disallowed by the system 10, and upon recognizing viewable content (e.g., posts) that may fall into these categories, the application 114 may remove the content. The application 114 also may notify the users Un responsible for the disallowed content of the content's removal and that he/she must avoid these topics in the future. If it is deemed that a particular user Un continually posts disallowed content after a predetermined number of warnings, the user Un may be removed from the system 10. In some embodiments, the application 114 may scan all publicly viewable content and identify keywords that may be associated with disallowed topics. In other embodiments, the application 114 may utilize deep machine learning algorithms to learn language associated with disallowed topics, and subsequently use the learned language to identify and remove disallow posts.

Figure 5:
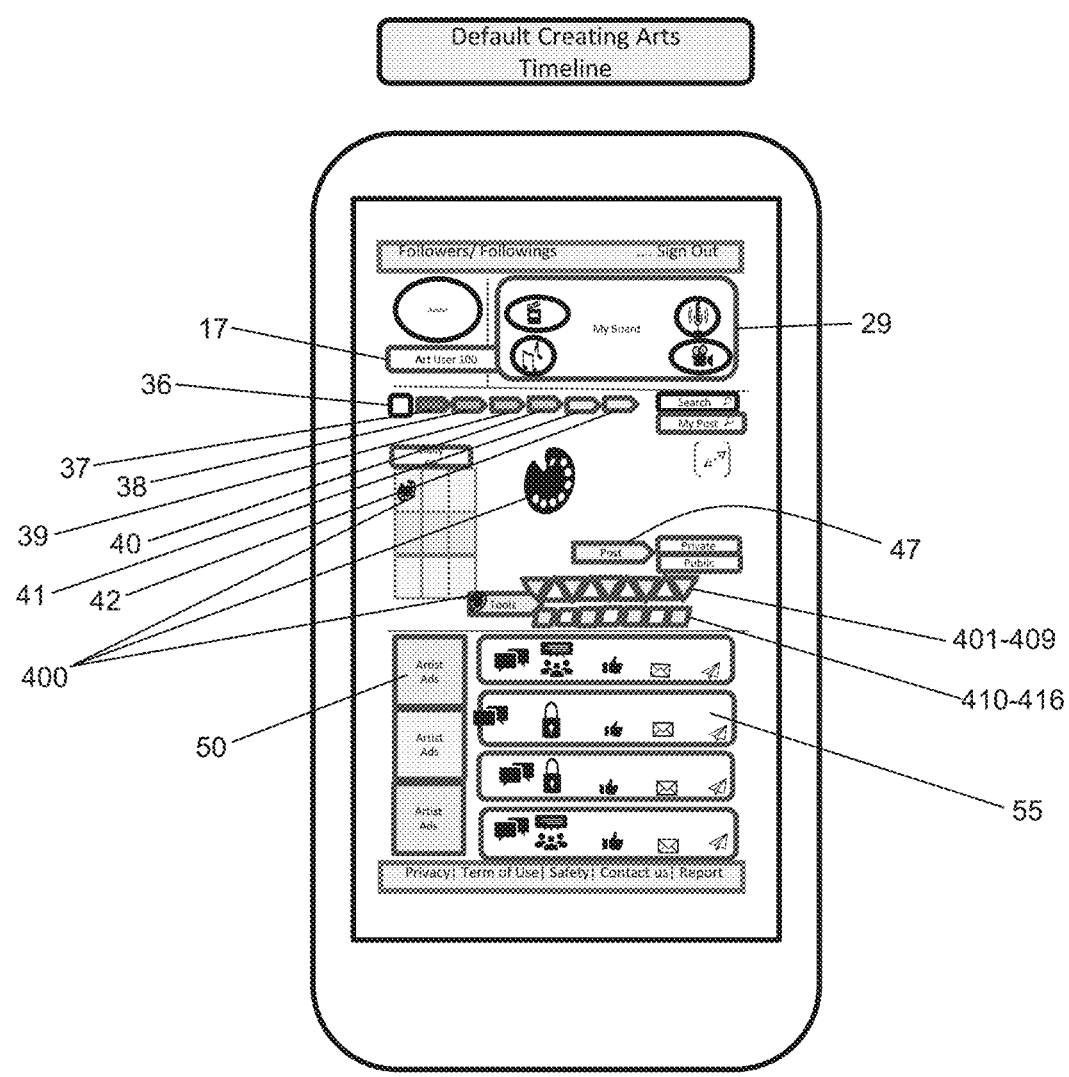
Figure 6:
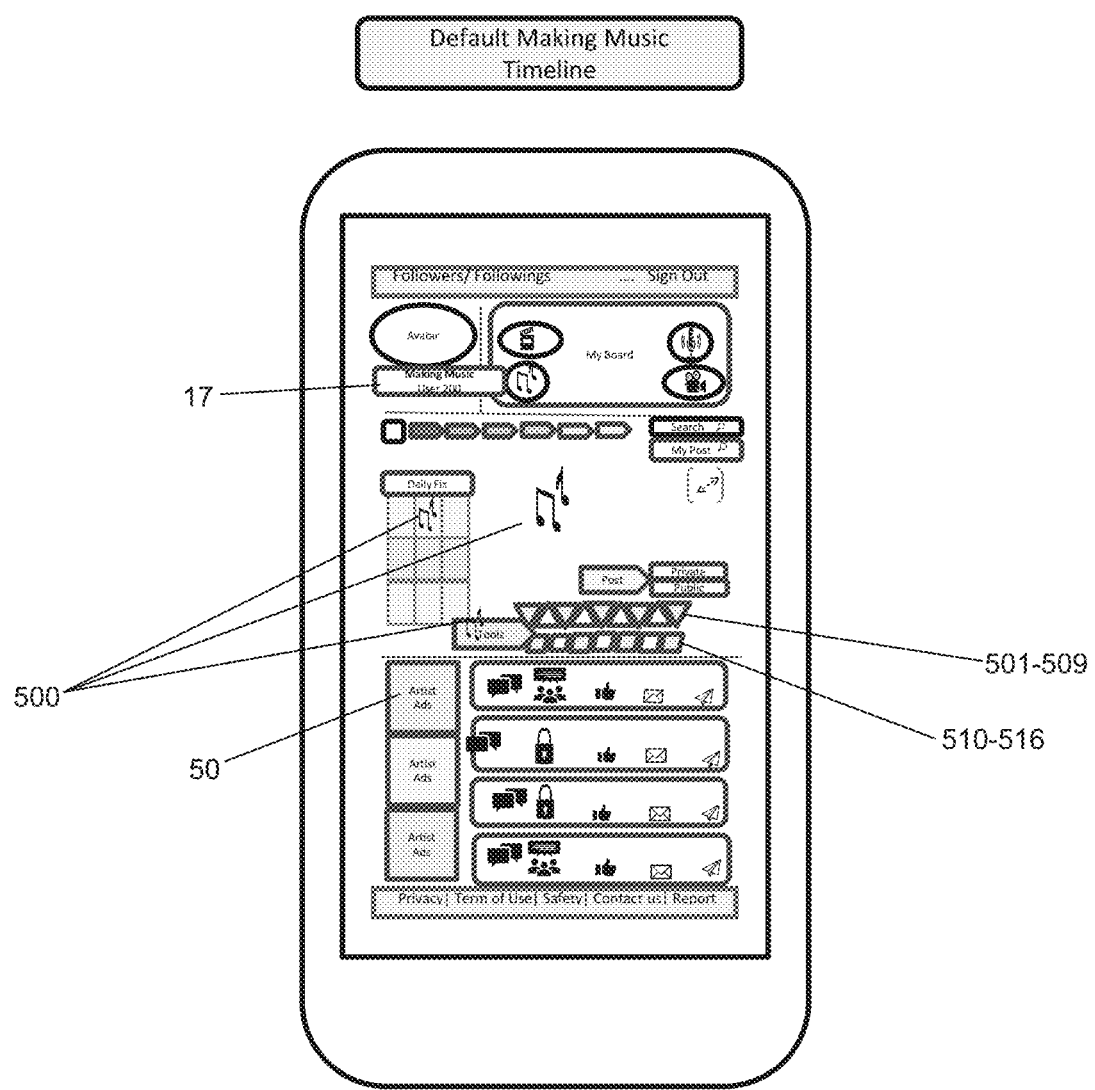
Figure 7:
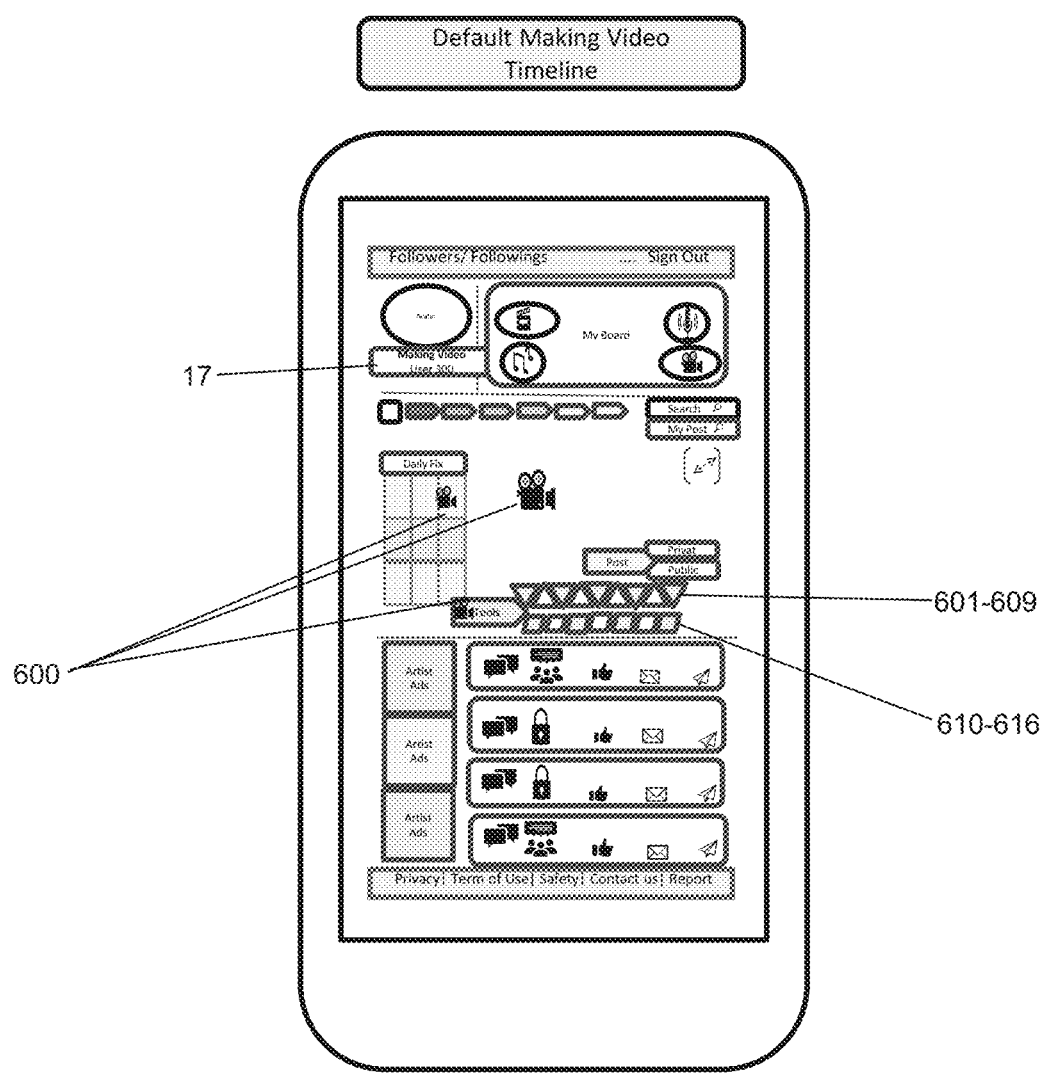
Figure 8:
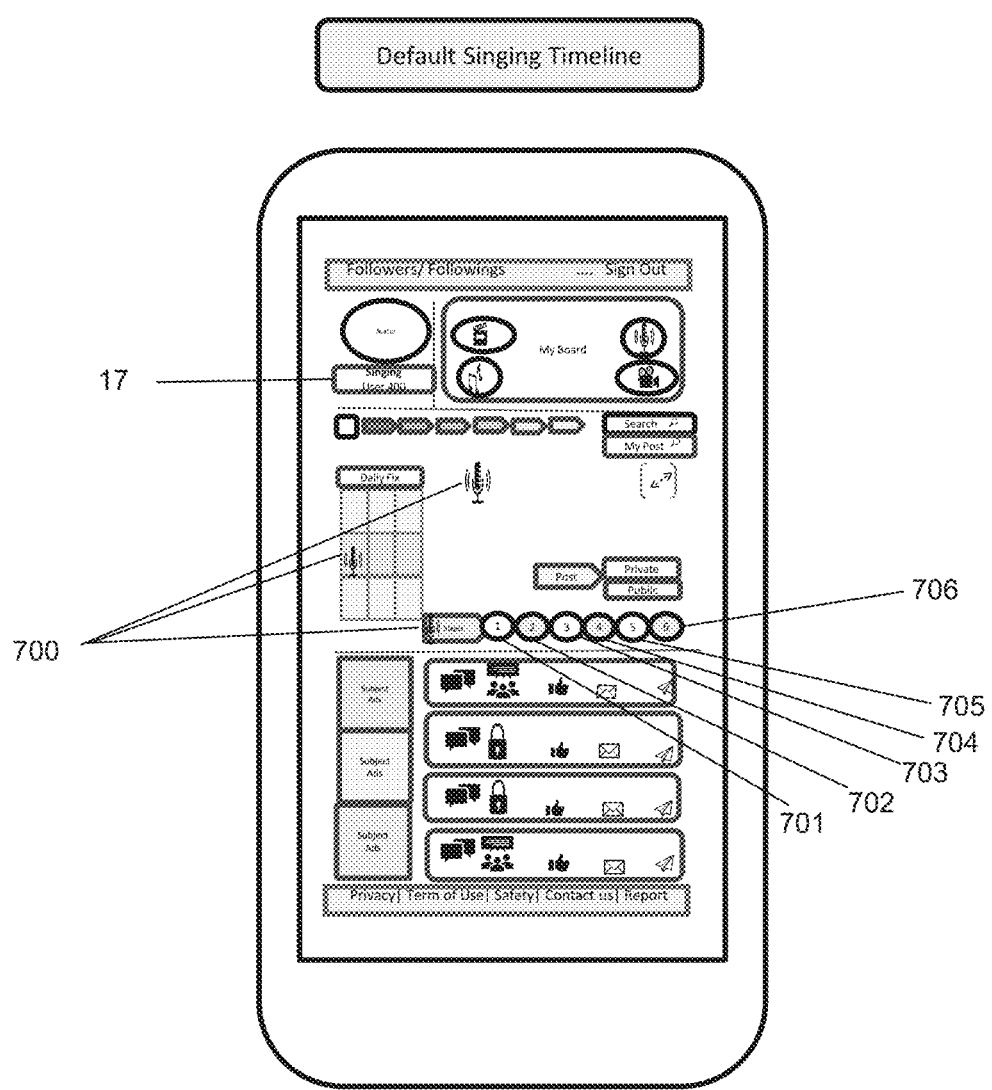
Figure 9:
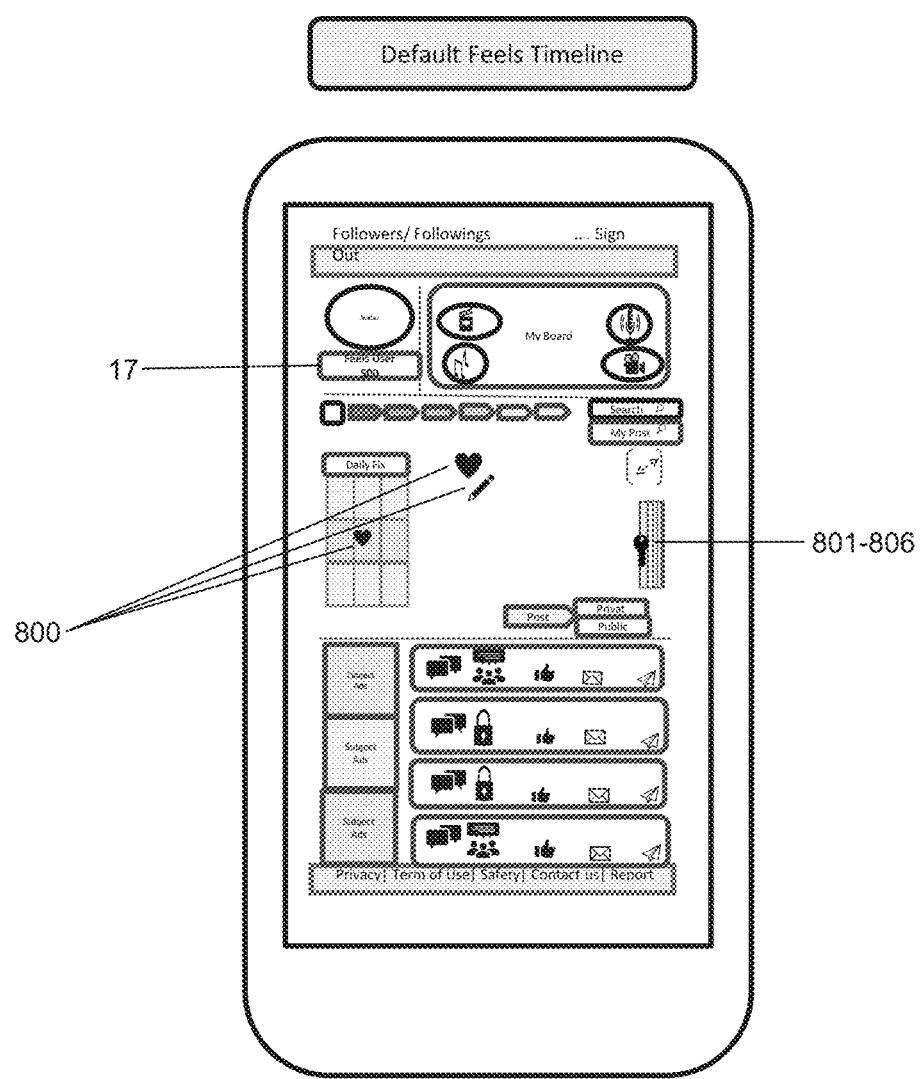
Figure 10:
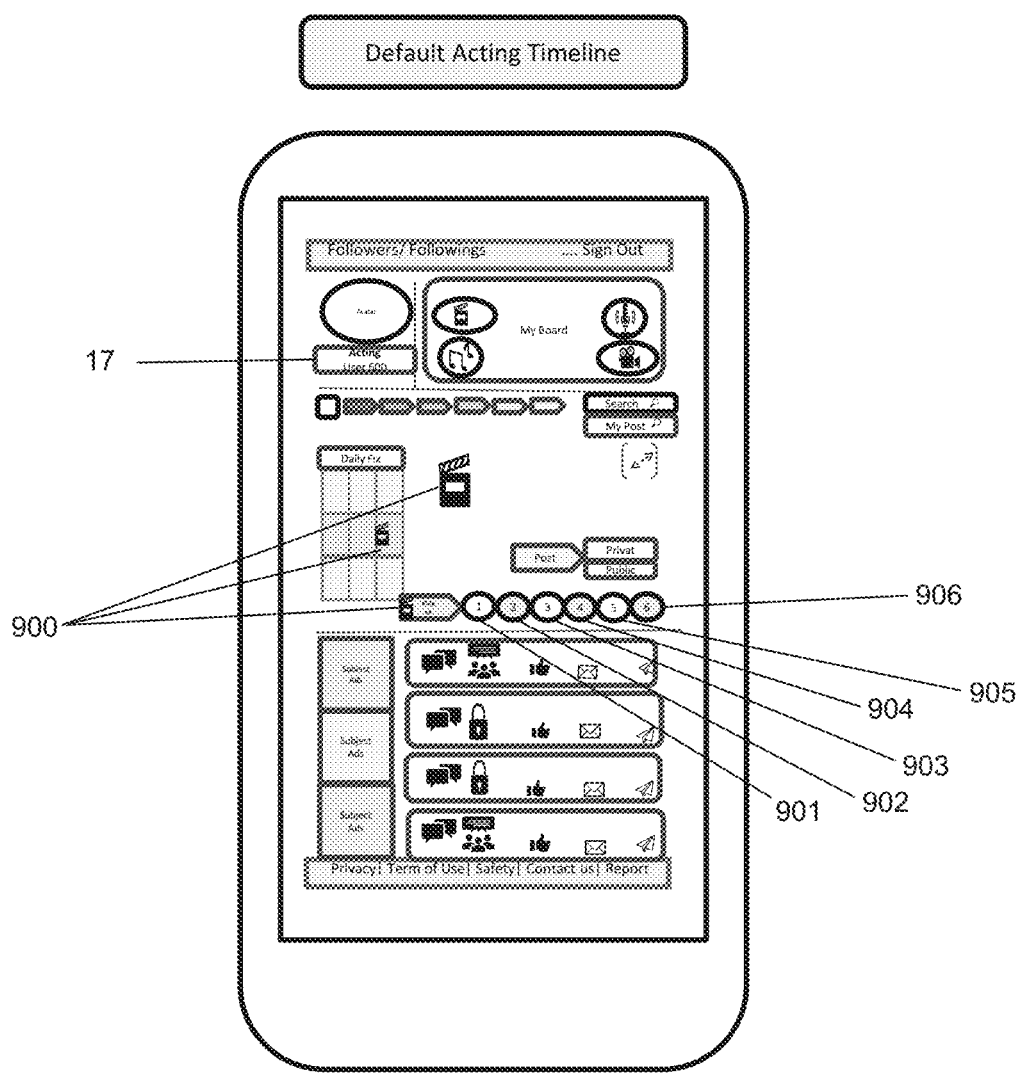
Figure 11:
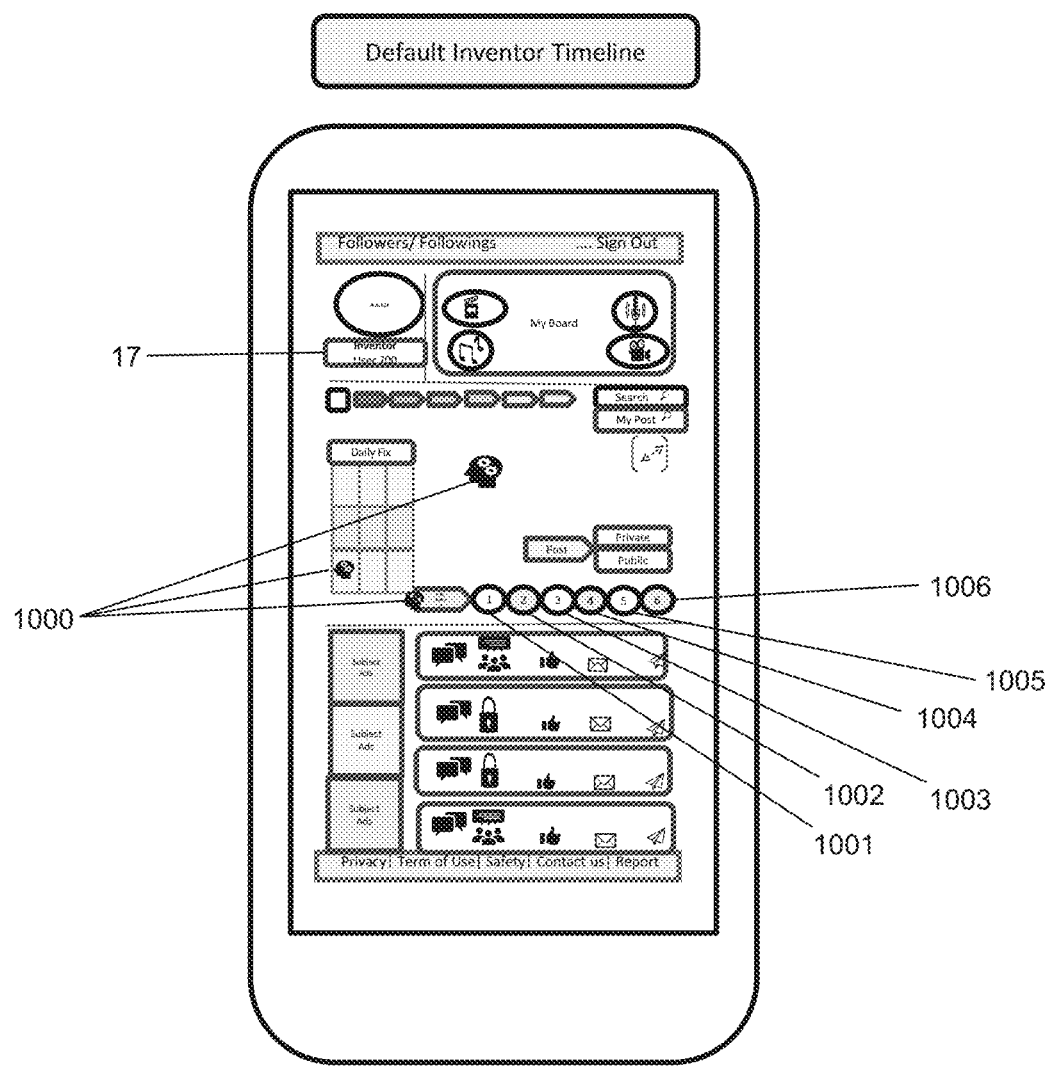
Figure 12:
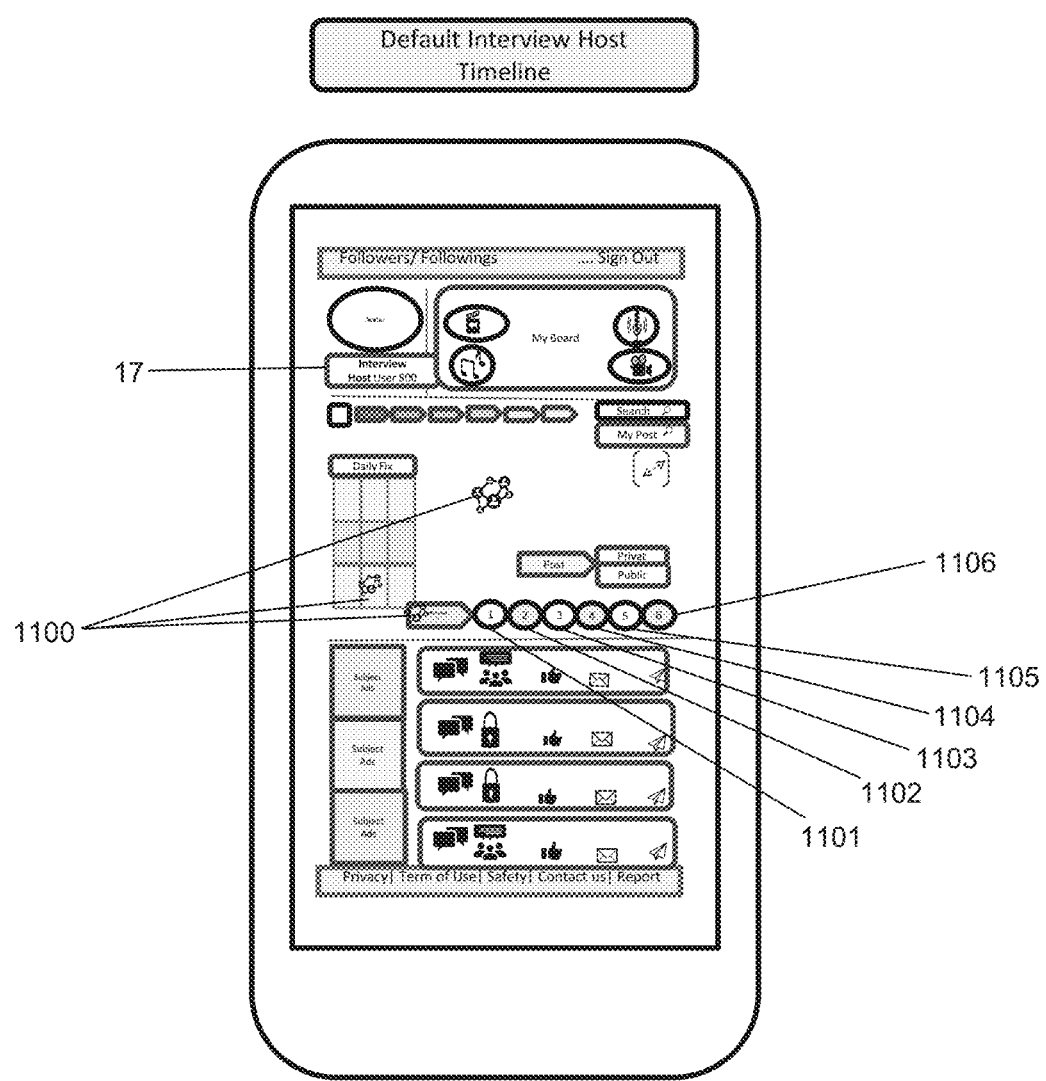
Figure 13:
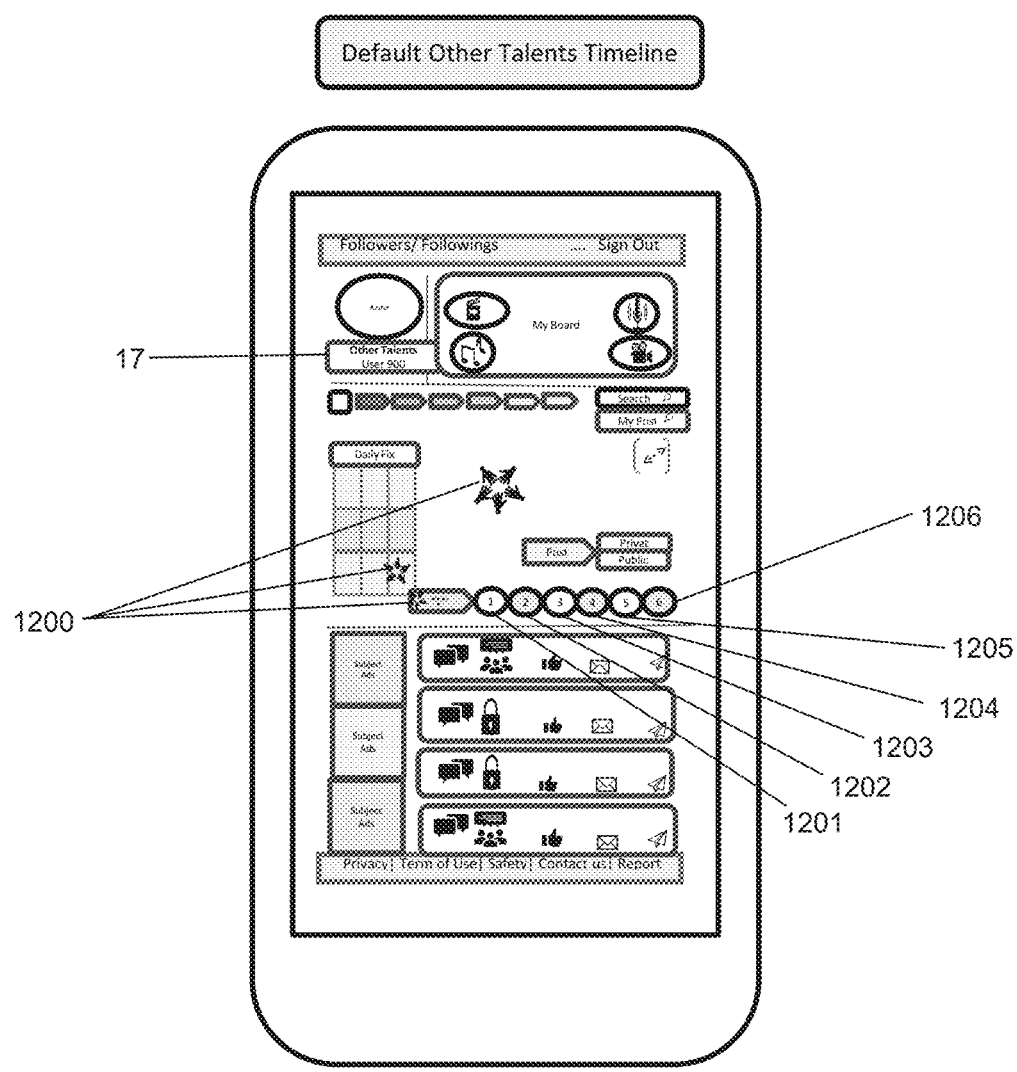

In one exemplary embodiment hereof, the topic server application 116 provides the platform and/or tools for each user Un to engage with the system 10 and with other users Urn while expressing themselves through creative expression. Information relating to the topical platform(s) and/or topical tools may be stored in the topics database 126. The tools may include tools to create content, to share content, to explore content, to learn new content, to build communities around content, to provide interactions between users Un regarding content and other types tools. The tools may be provided in the form of graphical user interfaces (GUIs), buttons, selectable tools, checkboxes, slide bars, menus, icons, other types of tools and any combination thereof. In some embodiments, the tools may be launched using the daily fix 46 section of the GUI 302. In some embodiments, the topic server application 116 may provide at least some of the tools listed below for users Un to engage with the system 10 and with other users Um in the areas of (without limitation):

1. Creating artwork: The tools for this topic may include graphic art editors, graphic art creation tools, illustration tools, photography editing tools, tools that allow the user Un to add motion or other effects to artwork he/she may engage with, tools that allow a user to blend photographs with graphics, sketches, animations or other types of artwork, other types of tools associated with artwork and any combination thereof. These tools may be launched by a user Un using daily fix tools 400-416 (FIG. 5).
2. Creating music: The tools for this topic may include music creating tools, sound creating tools, sound effect creating tools, rhythm and beat creating tools, audio mixing tools, DJ tools, dubbing tools, synthesized instrument tool including electric guitars, bass guitars, drums, keyboards, horns, other instruments, other types of tools associated with music and any combination thereof. These tools may be launched by a user Un using daily fix tools 500-516 (FIG. 6)
3. Creating video: The tools for this topic may include video creation tools, video editing tools, video effects tools, animation tools, storytelling development tools, script development tools, costume development tools, cinematography tools, music score tools, other types of tools associated with video and any combination thereof. These tools may be launched by a user Un using daily fix tools 600-616 (FIG. 7).
4. Singing: The tools for this topic may include song/vocal recording tools, song writing tools, song editing tools, song mixing tools, karaoke tools (with a library of provided songs), sound cancellation microphones, other types of tools associated with singing and any combination thereof. These tools may be launched by a user Un using daily fix tools 700-706 (FIG. 8).
5. Journaling and/or other types of creative writing: The tools for this topic may include journaling tools, community support tools for topics covered in the journaling, authoring tools, short story drafting tools, novel drafting tools, fiction and/or non-fiction drafting tools, storyline development tools, other types of tools associated with journaling and/or creative writing and any combination thereof. These tools may be launched by a user Un using daily fix tools 800-806 (FIG. 9).
6. Acting: The tools for this topic may include script reading tools, acting coaching tools (live and/or recorded), performance recording tools, character development tools, plotline development tools, other types of tools associated with acting and any combination thereof. These tools may be launched by a user Un using daily fix tools 900-906 (FIG. 10).
7. Inventing: The tools for this topic may include engineering tools, product development tools, prototyping tools (e.g., 3D printing tools), computer aided design (CAD) tools, software development tools, other types of tools associated with inventing and any combination thereof. These tools may be launched by a user Un using daily fix tools 1000-1006 (FIG. 11).
8. Hosting and/or interviewing: The tools for this topic may include interviewing tools, hosting tools, interview coaching (live or recorded), topic development tools, research tools, public speaking coaching, other types of tools associated with hosing and/or interviewing and any combination thereof. The tools may also provide sample interview practice questions, dress code suggestions, etc. These tools may be launched by a user Un using daily fix tools 1100-1106 (FIG. 12).
9. Other types of creative endeavors and outlets. In some embodiments, the users Un may add new topics to the topic database 126 and the system 10 may provide tools for the new topics in daily fix tool section. These tools may be launched by a user Un using daily fix tools 1200-1206 (FIG. 13).

In addition to the topics described above, the topic server application 116 may serve other topics from other databases. For example, the application 116 may provide tools for resume and/or cover letter development while providing sample templates, structural recommendations, example verbiage, etc. The application 116 may also provide tools to search for jobs and/or post resumes, apply for internships and/or externships, learn information regarding different professions and careers, provide links to other resources such as job sites, and other career development resources. Other topics may include networking, advancement courses, and other topics.

In some embodiments, the system 10 and the topic serving application 112 may provide gaming functionalities so that the users Un may partake in various forms of gaming while engaging with the system 10. In some embodiments, the gaming may include educational games that may provide an educational experience to the users Un who engage with the games. Other types of gaming may be provided such as (without limitation) computer gaming, virtual reality (VR) gaming, 3-D gaming, 2-D gaming, augmented reality (AR)

gaming, single-player gaming, multiplayer gaming, other types of gaming and any combination thereof.

It is understood by a person of ordinary skill in the art upon reading this specification that the system 10 and/or the topic serving application 116 may include and/or provide other topics and/or other tools for other topics of any kind, and that the scope of the system 10 is not limited in any way by the topics and/or tools that the topic serving application 116 may provide.

In some embodiments, each user Un may utilize the pallet section 45 to journal, write, create artwork and/or perform any of the other creative activities offered by the system 10. In some embodiments, the tools provided by the topic server application 116 may be utilized within the pallet section 45 or within other sections of the GUI 302. In some embodiments, each user Un may utilize the my board section 29 to share his/her creative content developed in the pallet section 45 or elsewhere.

In some embodiments, content created by each user Un while utilizing the system 10 (e.g., while utilizing tools provided by the topic serving application 116) may be chosen by the user Un to remain private, to be public to a limited person or group of persons, to be public to all users Un, or any combination thereof.

In one exemplary embodiment hereof, the tag tracking application 118 is used to by users Un to associate particular category topics, subjects, titles, subtitles, and other types of classifications of subject matter to content posted, generated or otherwise associated with the system 10. For example, a wide variety of category topics and/or subjects (also referred to as system tags) may be stored within the tags database 128, and the tag tracking application 118 may be used to associate a particular tag stored in database 128 to a post uploaded by a particular user Un. To associate a post with a particular system tag, the user Un may utilize the tag tools 36, 37, 38, 39, 40, 41 and 42. In this way, the system tags may be used instead of hashtags tracking technology, thereby further preserving the privacy of the users Un.

In some embodiments, tag tool 36 may be used to direct the topical locations where the posts may be stored and/or shared. Tag functions tool 37 (e.g., fee/offer/request/suggest) may be used to direct where the posts are to be shared based on functions of interest. Tag category tool 38 may be used to direct where posts may be shared based on categories of interest. Tag subject tool 39 may be used to direct where posts may be shared based on the subject of interest. Tag title tool 40 may be used to direct where posts may be shared based on the title of interest. Tag subtitle tool 41 may be used to direct where posts may be shared based on the subtitle of interest. Tag subtitle no. 2 tool 42 may be used to direct where posts may be shared based on the subtitle no. 2 of interest. Other types of tag tools may also be utilized.

Additional elements and functionalities of the GUI 302 and of the system 10, its applications 110 and its databases 108 are described below with reference to FIGS. 4-12. It is understood that the elements described are meant for demonstration and that the system 10 may or may not include some or all of the elements described.

Followers 23 shows how many followers a user Un may have. This information may only be viewable by the respective user Un.

Following 24 shows how many users Um a particular user Un may be following. This information may only be viewable by the respective user Un.

Avatar 25 may include a graphic image that may act as a representative picture for each respective user Un. In some embodiments, no human pictures, selfies or any other type of identifying images may be used.

Sign In 26 allows users Un to log into the system 10.

File 27 may allow users Un to access other information and/or services provided by the system 10.

Sign Out 28 may allow users Un to log off the system 10.

My Board 29 may allow users Un to post their favorite creatives in this section to share with other users Urn. For example, my board 29 may include my board singing 30, my board acting 31, my board making video 32, my board making music 33 and other types of creatives.

Search General 34 may allow users Un to search for topics, posts, conversations, creatives, content and/or tags of interest on the system 10

Search My Post 35 may allow users Un to search for their own posts of interest.

Key Journal Outcomes 43 may allow users Un to create, share and store their journaling (e.g., via the journaling and creative writing topic tools 500) to identify future personal actions, resolved strategies, solution focus, comments, updates, and/or suggestions.

Expand Page 44 may allow users Un to expand the page to give greater focus on the task of interest.

Journal Messaging Space 45 may allow users Un to journal their thoughts and feelings to mitigate stressors Post plugin 47 may allow users Un to create and share posts with other users Urn on the system 10.

Post Private 48 may allow users Un to save posts on his/her timeline that are visible only to him/her (e.g., private).

Post Public 49 may allow users Un to save posts on his/her timelines that are visible to all users Um sharing the same tag buttons.

Commercial Ads 50 may show ads served by the system 10. In some embodiments, the ads may be commonly shared on pages of similar categories, subjects, titles, and subtitles tags.

User Un previous posts 55 show previous posts the user Un may have posted on his/her timeline. In some embodiments the previous posts 55 may be only viewed by the respective user Un who posted them. In other embodiments, the posting user Un may allow other users Um to view some or all of the previous posts 55. The posts 55 may be shown by date, by topic, by tags, by other referencing methods and any combination thereof. The number of likes 54, the number of comments 53 and the number of shares 52 for each of the previous posts also may be shown, either to only the respective user Un of the posts or to some or all of the users Urn of the system 10. In some embodiments, comments associated with each previous post 55 also may be available to those users Urn who may have provided the comments and to the user Un of the post. In other embodiments, the comments may be viewable by some or all of the users Um of the system 10.

Report 56 may allow users Un to notify the administrators of the system 10 of issues or problems.

Contact Us 57 may allow the users Un to contact the administrators of the system 10.

Safety 58 may provide users Un a reminder of caution in connection with suspicious activities.

Terms of Use 59 may provide users Un the terms of use of the system 10.

Privacy 60 may provide users Un the privacy statement of the system 10.

It is understood that any aspect of any embodiment described herein or otherwise may be combined with any other aspect of any other embodiment to form a new and well understood embodiment within the scope of the system 10.

Computing

The services, mechanisms, operations and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 14:
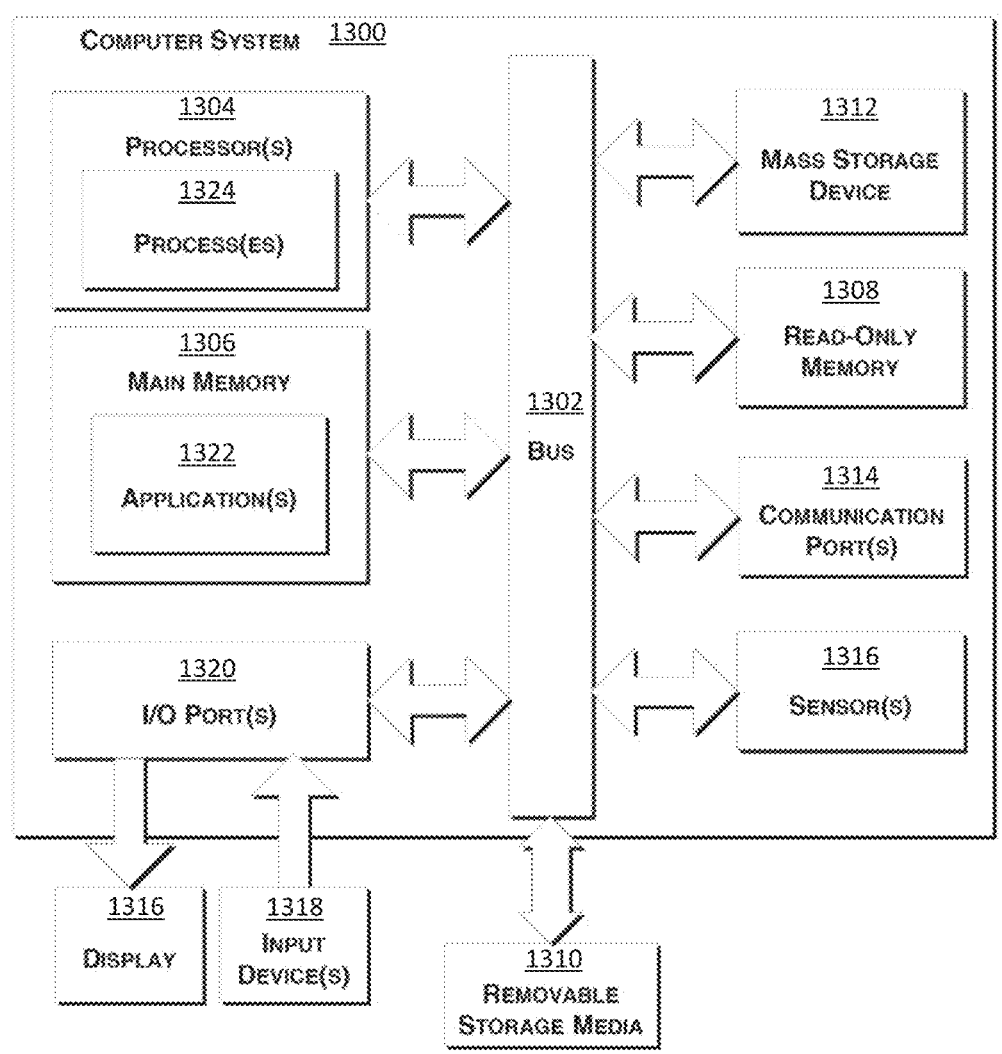
FIG. 14 depicts aspects of computing and computer devices in accordance with exemplary embodiments hereof.

FIG. 14 is a schematic diagram of a computer system 1300 upon which embodiments of the present disclosure may be implemented and carried out.

According to the present example, the computer system 1300 includes a bus 1302 (i.e., interconnect), one or more processors 1304, one or more communications ports 1314, a main memory 1306, removable storage media 1310, read-only memory 1308, and a mass storage 1312. Communication port(s) 1314 may be connected to one or more networks by way of which the computer system 1300 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 1304 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 1314 can be any of an RS-232 port for use with a modem-based dial-up connection, a 10/100 Ethernet port, a Gigabit port using copper or fiber, or a USB port, and the like. Communications port(s) 1314 may be chosen depending on a network such as a Local Area Network (LAN), a Wide Area Network (WAN), a CDN, or any network to which the computer system 1300 connects. The computer system 1300 may be in communication with peripheral devices (e.g., display screen 1316, input device(s) 1318) via Input/Output (I/O) port 1320. Some or all of the peripheral devices may be integrated into the computer system 1300, and the input device(s) 1318 may be integrated into the display screen 1316 (e.g., in the case of a touch screen).

Main memory 1306 can be Random Access Memory (RAM), or any other dynamic storage device(s) commonly known in the art. Read-only memory 1308 can be any static storage device(s) such as Programmable Read-Only Memory (PROM) chips for storing static information such as instructions for processor(s) 1304. Mass storage 1312 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 1302 communicatively couples processor(s) 1304 with the other memory, storage and communications blocks. Bus 1302 can be a PCI/PCI-X, SCSI, a Universal Serial Bus (USB) based system bus (or other) depending on the storage devices used, and the like. Removable storage media 1310 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random-access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 1306 is encoded with application(s) 1322 that support(s) the functionality as discussed herein (an application 1322 may be an application that provides some or all of the functionality of one or more of the mechanisms described herein). Application(s) 1322 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 1304 accesses main memory 1306 via the use of bus 1302 in order to launch, run, execute, interpret or otherwise perform the logic instructions of the application(s) 1322. Execution of application(s) 1322 produces processing functionality of the service(s) or mechanism(s) related to the application(s). In other words, the process(es) 1324 represents one or more portions of the application(s) 1322 performing within or upon the processor(s) 1304 in the computer system 1300.

It should be noted that, in addition to the process(es) 1324 that carries(carry) out operations as discussed herein, other embodiments herein include the application 1322 itself (i.e., the unexecuted or non-performing logic instructions and/or data). The application 1322 may be stored on a computer readable medium (e.g., a repository) such as a disk or in an optical medium. According to other embodiments, the application 1322 can also be stored in a memory type system such as in firmware, read only memory (ROM), or, as in this example, as executable code within the main memory 1306 (e.g., within Random Access Memory or RAM). For example, application 1322 may also be stored in removable storage media 1310, read-only memory 1308, and/or mass storage device 1312.

Those skilled in the art will understand that the computer system 1300 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed:

1. A computer-implemented method comprising:
    (A) by one or more computer systems, receiving an indication of a first user action by a first user, the first user having a first user account with the computer system; and
    (B) by one or more computer systems, when the indication is received:
        (C) determining if the action includes reference to one or more legal names of a second user, the second user having a second user account with the computer system unassociated with the first user account;
        (D) in response to a determination that the action includes reference to one or more legal names of the second user, then:
            (E) determining whether the second user has indicated any preference to exclude his or her legal name from any actions;

(F) in response to a determination that the second user has indicated a preference to exclude reference to his or her legal name from any actions, removing the reference to the one or more legal names of the second user from the action; and (G) processing the action.

2. The method of claim 1 wherein the first user action is the submission of a first post.

3. The method of claim 2 wherein the first post comprises one or more of: a written status update, a written wall post, a written comment, a picture, a like, or a video.

4. The method of claim 2 wherein determining if the first post includes reference to one or more legal names of the second user comprises matching one or more names in the first post to one or more names in a database of names.

5. The method of claim 1 wherein the system includes a social-networking system, the social-networking system comprising a graph that comprises a plurality of nodes and edges connecting the nodes, at least one node in the graph corresponding to the first user, and at least one node in the graph corresponding to the second user.

6. The method of claim 1 further comprising the steps:
(H) by one or more computer systems, providing a first interface to the first user wherein the first interface enables the first user to engage with one or more applications.

7. The method of claim 6 wherein the one or more applications are selected from the group:
an application to create artwork;
an application to create music;
an application to create video;
an application to record singing;
an application to submit journaling and/or creative writing;
an application to record acting;
an application to enable inventing;
an application to record hosting and/or interviewing; and
an application to play games.

8. A system comprising:
one or more processors; and
a memory coupled to the processors comprising instructions executable by the processors, the processors being operable when executing the instructions to:
(A) receive an indication of a first user action by a first user, the first user having a first user account with the system; and
(B) when the indication is received:
(C) determine if the action includes reference to one or more legal names of a second user, the second user having a second user account with the system unassociated with the first user account;
(D) in response to a determination that the action includes reference to one or more legal names of the second user, then:
(E) determine whether the second user has indicated any preference to exclude his or her legal name from any actions;
(F) in response to a determination that the second user has indicated a preference to exclude reference to his or her legal name from any actions, remove the reference to the one or more legal names of the second user from the action; and
(G) process the action.

9. The system of claim 8 wherein the first user action is the submission of a first post.

10. The system of claim 9 wherein the first post comprises one or more of: a written status update, a written wall post, a written comment, a picture, or a video.

11. The system of claim 9 wherein determining if the first post includes reference to one or more legal names of the second user comprises matching one or more names in the first post to one or more names in a database of names.

12. The system of claim 8, wherein the system includes a social-networking system, the social-networking system comprising a graph that comprises a plurality of nodes and edges connecting the nodes, at least one node in the graph corresponding to the first user, and at least one node in the graph corresponding to the second user.

13. The system of claim 8 further comprising the steps:
(H) by one or more computer systems, providing a first interface to the first user wherein the first interface enables the first user to engage with one or more applications.

14. The system of claim 13 wherein the one or more applications are selected from the group:
an application to create artwork;
an application to create music;
an application to create video;
an application to record singing;
an application to submit journaling and/or creative writing;
an application to record acting;
an application to enable inventing;
an application to record hosting and/or interviewing; and
an application to play games.

15. One or more computer-readable non-transitory storage media embodying software that is operable when executed to:
(A) receive an indication of a first user action by a first user of a system, the first user having a first account with the system; and
(B) when the indication is received:
(C) determine if the action includes reference to one or more legal names of a second user, the second user having a second user account with the system unassociated with the first user account;
(D) in response to a determination that the action includes reference to one or more legal names of the second user, then:
(E) determine whether the second user has indicated any preference to exclude his or her legal name from any actions;
(F) in response to a determination that the the second user has indicated a preference to exclude reference to his or her legal name from any actions, remove the reference to the one or more legal names of the second user from the action; and
(G) process the action.

16. The media of claim 15 wherein the first user action is the submission of a first post.

17. The media of claim 16 wherein the first post comprises one or more of: a written status update, a written wall post, a written comment, a picture, or a video.

18. The media of claim 16 wherein determining if the first post includes reference to one or more legal names of the second user comprises matching one or more names in the first post to one or more names in a database of names.

19. The media of claim 15 wherein the system includes a social-networking system, the social-networking system comprising a graph that comprises a plurality of nodes and edges connecting the nodes, at least one node in the graph corresponding to the first user, and at least one node in the graph corresponding to the second user.

20. The media of claim 15 further comprising the steps:
(H) by one or more computer systems, providing a first interface to the first user wherein the first interface enables the first user to engage with one or more applications, wherein the one or more applications are selected from the group:
an application to create artwork;
an application to create music;
an application to create video;
an application to record singing;
an application to submit journaling and/or creative writing;
an application to record acting;
an application to enable inventing;
an application to record hosting and/or interviewing; and
an application to play games.

\* \* \* \* \*